United States Patent [19]

Bernier

[11] 4,223,298
[45] Sep. 16, 1980

[54] ANTI-THEFT AND ALARM DEVICE FOR A VEHICLE

[76] Inventor: Raymond Bernier, 29, Avenue Foch, F-94300 Vincennes, France

[21] Appl. No.: 913,718

[22] Filed: Jun. 7, 1978

[30] Foreign Application Priority Data

Jun. 13, 1977 [FR] France .............................. 77 18768
Jan. 9, 1978 [FR] France .............................. 78 00852

[51] Int. Cl.² ...................... B60R 25/04; B60R 25/10
[52] U.S. Cl. .............................. 340/64; 307/10 AT; 180/287
[58] Field of Search .............. 340/63, 64; 307/10 AT; 180/114

[56] References Cited

U.S. PATENT DOCUMENTS

| 3,422,398 | 1/1969 | Rubin | 340/63 |
|---|---|---|---|
| 3,553,641 | 1/1971 | Moragne | 340/64 |
| 3,878,507 | 4/1975 | Medlock | 340/63 |

Primary Examiner—Alvin H. Waring
Attorney, Agent, or Firm—William A. Drucker

[57] ABSTRACT

The battery is connected to the terminal supplying the electrical system and the starter relay or the primary ignition circuit by a thyristor. The latter's gate is controlled by a switch. Another switch makes it possible to establish a brief short-circuit to extinguish the thyristor. Any current draw then supplies the winding of an alarm relay.

5 Claims, 4 Drawing Figures

ANTI-THEFT AND ALARM DEVICE FOR A VEHICLE

The invention concerns anti-theft and alarm devices and particularly those which cut off the connection between the battery of a vehicle and its electrical system, including either the starter relay or the primary ignition circuit or which short-circuit said elements and trigger off an alarm when an unauthorised person tries to use the starter, open the boot or the doors of the vehicle.

Various solutions have been devised to carry out the battery cut-off function, e.g. using electromechanical relays. These known devices are generally relatively complicated and costly.

The aim of the invention is to produce a particularly simple, cheap and reliable device.

The device according to the invention is mainly characterised by a controlled static switch with a semi-conductor cut in on the connection between the battery and the element which it is wished to put out of action or cut in in such a way as to short-circuit said element, and by means, connected to the control electrode of said controlled static switch, of firing it by application of a pulse and means of causing the extinction of said controlled static switching element by briefly short-circuiting it.

Figure 1:
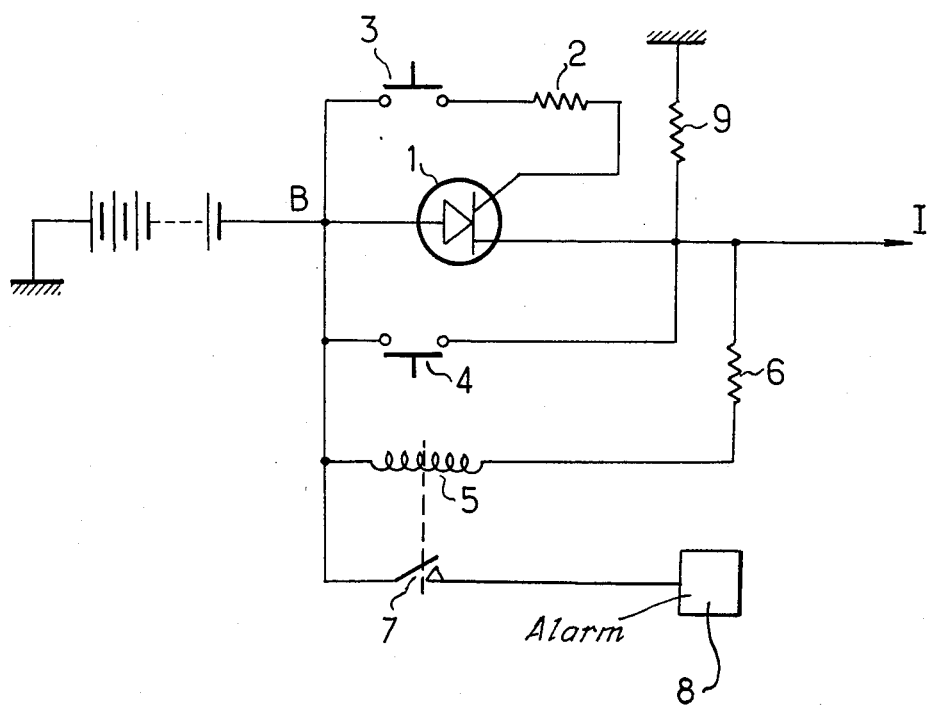
Figure 2:
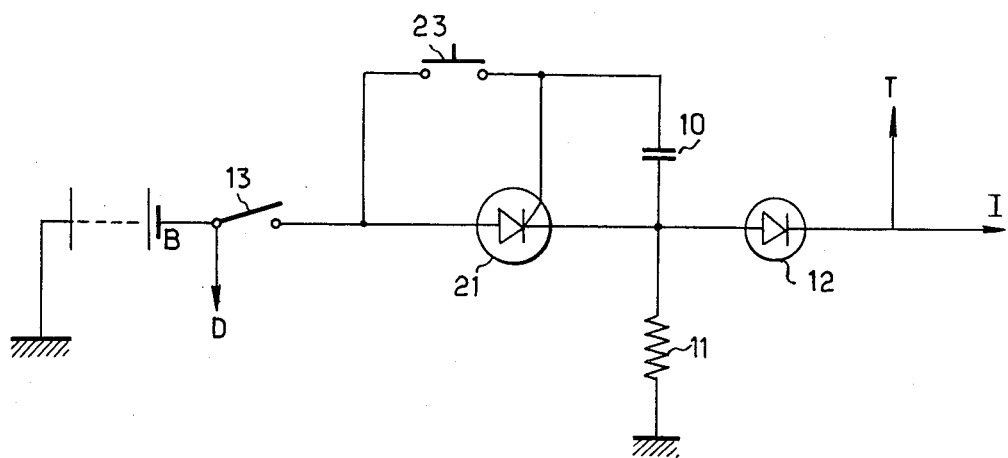
Figure 3:
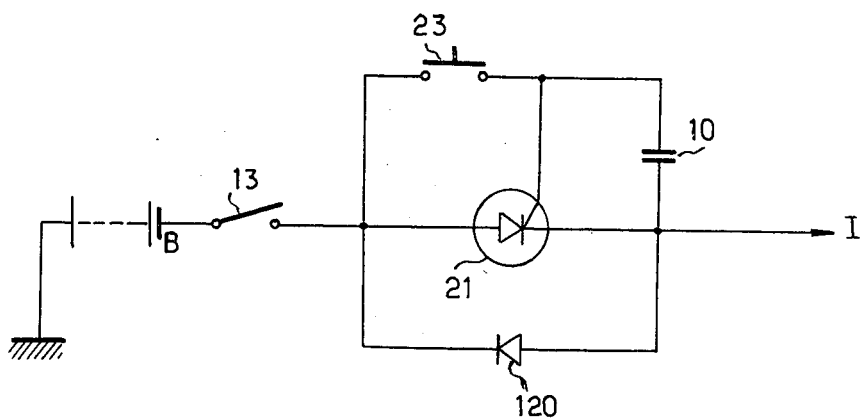
Figure 4:
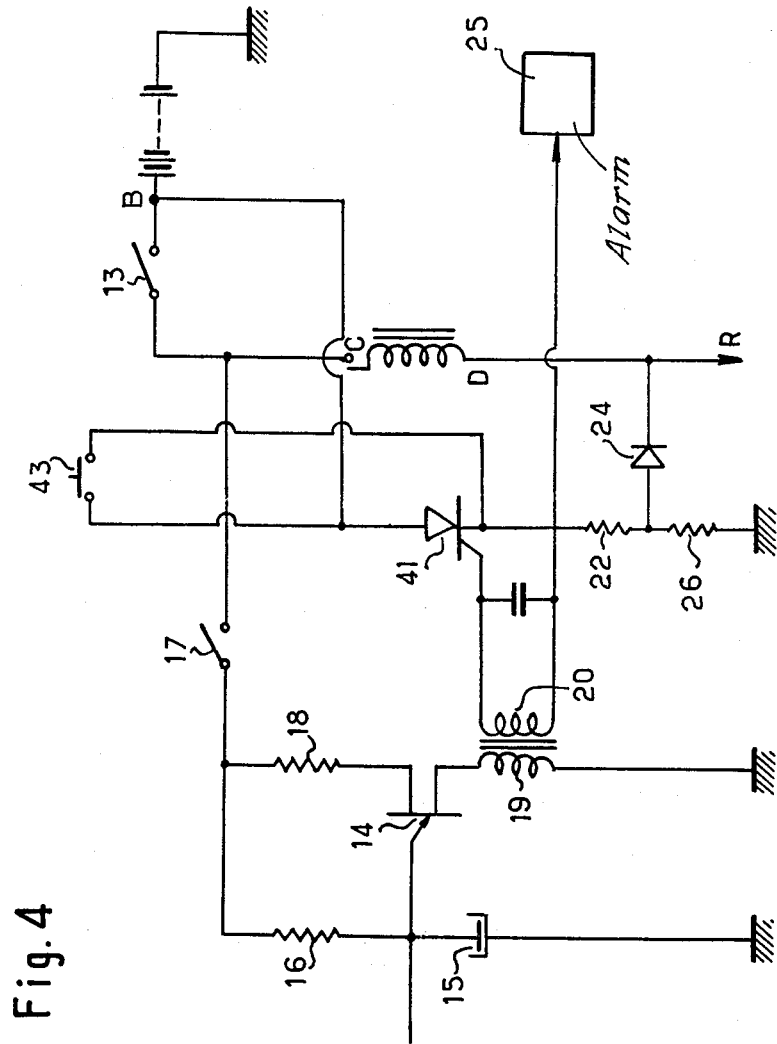

A better understanding of the invention will be obtained from the following description:

In the attached drawing:

FIG. 1 shows a first form of embodiment of an anti-theft and alarm circuit in accordance with the invention and FIGS. 2 and 3 show variants and FIG. 4 shows a circuit comprising a time-delay system.

The circuit in FIG. 1 includes a thyristor 1 in series between terminal B of the battery which is not grounded on the vehicle and the supply terminal I of the vehicle's electrical system (lighting, starter relay or primary ignition circuit, etc.). The gate of this thyristor is connected to the anode by a resistor 2 in series with a switch 3. The cathode is connected to the anode, on the one hand by a wire fitted with a switch 4 and on the other hand by a wire fitted with a relay coil 5, possibly in series with a resistor 6. A contact which is normally open 7, controlled by this relay, connects terminal B to an alarm device 8 advantageously consisting of the vehicle's headlamps and horn.

A resistor 9 connects the cathode of the thyristor to the ground in order to facilitate its priming. Switches 3 and 4 are permanently open and can be closed temporarily for a short time. They are advantageously made up of an electronic element or a switch (contact controlled by a magnet) and operated by the insertion or withdrawal of the ignition key, or any other means.

When the vehicle is in normal use, thyristor 1 is conductive. For this purpose, switch 3 has been closed for the length of a brief pulse. Terminal I is therefore connected to the battery through the thyristor.

When the driver wants to leave the vehicle, he causes the temporary closure of contact 4. This has the effect of short-circuiting the thyristor, therefore extinguishing it. Terminal I then ceases to be supplied, the resistance of coil 5, possibly increased by the value of resistor 6, being much higher than that of the elements of the system connected at I. The anti-theft function has thus been achieved, since the starter relay is not excited.

Moreover, any action which would normally be translated by the putting into operation of one of the elements of the electrical system connected to terminal I (opening the boot or the doors, operating the starter, etc.) causes a weak current to be drawn into coil 5. This current draw is sufficient to operate relay 7 and trigger off the alarm. To restore the vehicle to normal working, it is sufficient to make the thyristor conductive again by causing the closure of transitory contact 3. Resistor 2 serves to limit the current.

This circuit is easy to make and not very expensive. Its operation is perfectly reliable.

The circuit in FIG. 2 comprises a thyristor 21 whose anode is connected to terminal B of the battery which is not grounded on the vehicle and whose cathode is connected to the supply terminal I of the vehicle's electrical system and the primary ignition circuit. However, the starter relay is supplied by terminal D directly connected to B.

The gate of thyristor 21 is connected to its anode by a switch 23. This contact is therefore open so long as the authorised user of the vehicle has not put a magnet close to a place known to him alone to cause its transitory closure. A capacitor 10 is connected between the gate and the cathode.

A diode 12 is mounted in series with thyristor 21, while a resistor 11 connects the anode of the thyristor to ground. The cathode of diode 12 is connected to terminal I and to a terminal T which supplies the fuel gauge.

The connection between the anode of the thyristor and the battery is effected through a switch 13 closed by the insertion of the vehicle's ignition key in the appropriate position.

After having made contact 13 and closed transitory contact 23, the authorised user can start his vehicle normally because thyristor 21 is conductive.

When the user stops his vehicle, he cuts off contact 13, so that the thyristor ceases to be supplied and extinguishes. It can only be put into operation again by closing transitory contact 23, thus by an authorised user. A possible thief, if he succeeds in making contact 13, will only be able to operate the starter and not supply the ignition. He will therefore be led to think that the vehicle is out of fuel, especially if the fuel gauge, not supplied, is at zero. It must be stressed that the device is an automatic anti-theft one.

The back currents which may come from the ignition circuit and have a tendency to cause the untimely extinction of the thyristor during normal operation are stopped by diode 12. If an eddy current occurs from any source, circulating in a direction liable to re-fire the thyristor, it charges capacitor 10 and thus avoids priming the thyristor when the anti-theft device is in use.

Possible alternating eddy voltages cannot cause extinction of the thyristor because resistor 11 gives rise to a direct voltage component on the cathode.

It will be noted that, in the circuit described, the anti-interference capacitor which is normally provided for, should be eliminated.

In the variant in FIG. 3, the circuit is the same as in FIG. 2, with the exception of the fact that diode 12 in series with the thyristor is replaced by a diode 120 mounted in opposition to the terminals of the latter. This diode must be faster than the thyristor so as to constitute a conduction channel for eddy currents which will thus have no effect on the thyristor.

The circuits described could also be used to cut the connection between the battery and the starter relay and not the primary ignition circuit.

In the form of embodiment shown in FIG. 4, thyristor 41 is released, after a time-delay, in the following way:

The control electrode of a unijunction transistor 14 is connected to a capacitor 15, charged by the vehicle's battery through a resistor 16, when switch 13 controlled by the ignition key is closed and when switch 17 putting the anti-theft device into operation is also closed. When the charge of capacitor 15 reaches a predetermined value, which occurs after a time determined by the product of resistor 16 by capacitor 15 and equal, e.g., to 40 seconds, transistor 14 discharges through a resistor 18 and the winding 19 of a transformer 19-20. The result is the appearance of a pulse on the gate of thyristor 41 which becomes conductive. This conductive state is maintained by a resistor 21, in series with a protective resistor 22 on the cathode of the thyristor. The discharge from the thyristor has the effect of supplying an alarm device 23, of a type known in itself and, consequently, triggering off the alarm. Moreover, the ignition coil, cut in between terminals C and D, the latter connected to cutout R, and C connected to terminal B of the battery, is put out of action, its two terminals being at a neighbouring potential. To extinguish the thyristor and put the ignition coil back into operation, it is sufficient to close a transitory contact 43 which short-circuits the anode-cathode gap of the thyristor.

A diode 24 prevents untimely de-energizing of the thyristor and prevents conduction through resistor 21 when the vehicle is operating normally (when the thyristor is extinguished).

It will be noted that the device in FIG. 4 does not prevent the vehicle from being started by an unauthorised person, since the coil remains connected to terminal B. However, when the time mentioned above has elapsed, switch 17 having been closed by the authorised user before he left the vehicle and switch 13 being closed by insertion of the ignition key, the coil is put out of action and the alarm is given.

Various modifications of the circuits described and shown may be devised by a person skilled in the art, without departing from the spirit of the invention. In particular, the thyristor may be replaced by other electronic components fulfilling the same controlled static switch function.

I claim:

1. An anti-theft device for a vehicle having a source of direct current ignition means and connecting means including key-operated switching means, between the said source and the said ignition means; said anti-theft device comprising a solid-state controlled rectifier having an anode, a cathode and a gate; said connecting means including first circuit means connecting the said source to the said anode through the said key operated switching means and second circuit means connecting the said cathode to the said ignition means; said anti-theft device further comprising third circuit means, including a concealed temporarily closable switch, connecting the said key operated contact to the said gate.

2. Anti-theft device as claimed in claim 1, wherein said second circuit means include a diode having an anode connected to the cathode of said solid-state controlled rectifier and a cathode connected to the said ignition means, a capacitor connecting the anode of said diode to the said gate and a resistor connecting the anode of said diode to the earth.

3. An anti-theft device as claimed in claim 1, further comprising a diode having an anode connected to the cathode of said solid-state controlled rectifier and a cathode connected to the anode of said solid-state controlled rectifier, and a capacitor connecting the anode of said diode to said gate.

4. An anti-theft device for a vehicle having a source of direct current, ignition means and connecting means including key-operated switching means between the said source and the said ignition means, said anti-theft device comprising: a solid-state controlled rectifier having an anode, a cathode and a gate; first circuit means arranged for establishing through said solid-state controlled rectifier, a path of current conduction from said source which short-circuits the said ignition means; second circuit means including serially connected resistor and capacitor, having a junction point connecting the said key-operated switching means to the earth; solid-state switching means, having a control electrode and a main path of current flow from first to second electrodes, the first electrode being connected to the said key-operated switching means and the control electrode being connected to the said junction point; a pulse transformer having a primary winding connecting said second electrode to the earth and a secondary winding connecting the gate of said solid-state controlled rectifier to the cathode thereof; and third circuit means, including a concealed temporarily closable switch, connecting the anode of said solid-state controlled rectifier to the cathode thereof.

5. An anti-theft device as claimed in claim 4, wherein said second circuit means further comprise a switch serially connected with said key-operated switching means.

* * * * *